Dec. 30, 1952  R. H. FOSTER  2,623,437
MECHANISM FOR CARRYING AND RELEASING BOMBS AND ROCKETS
Filed Sept. 16, 1947
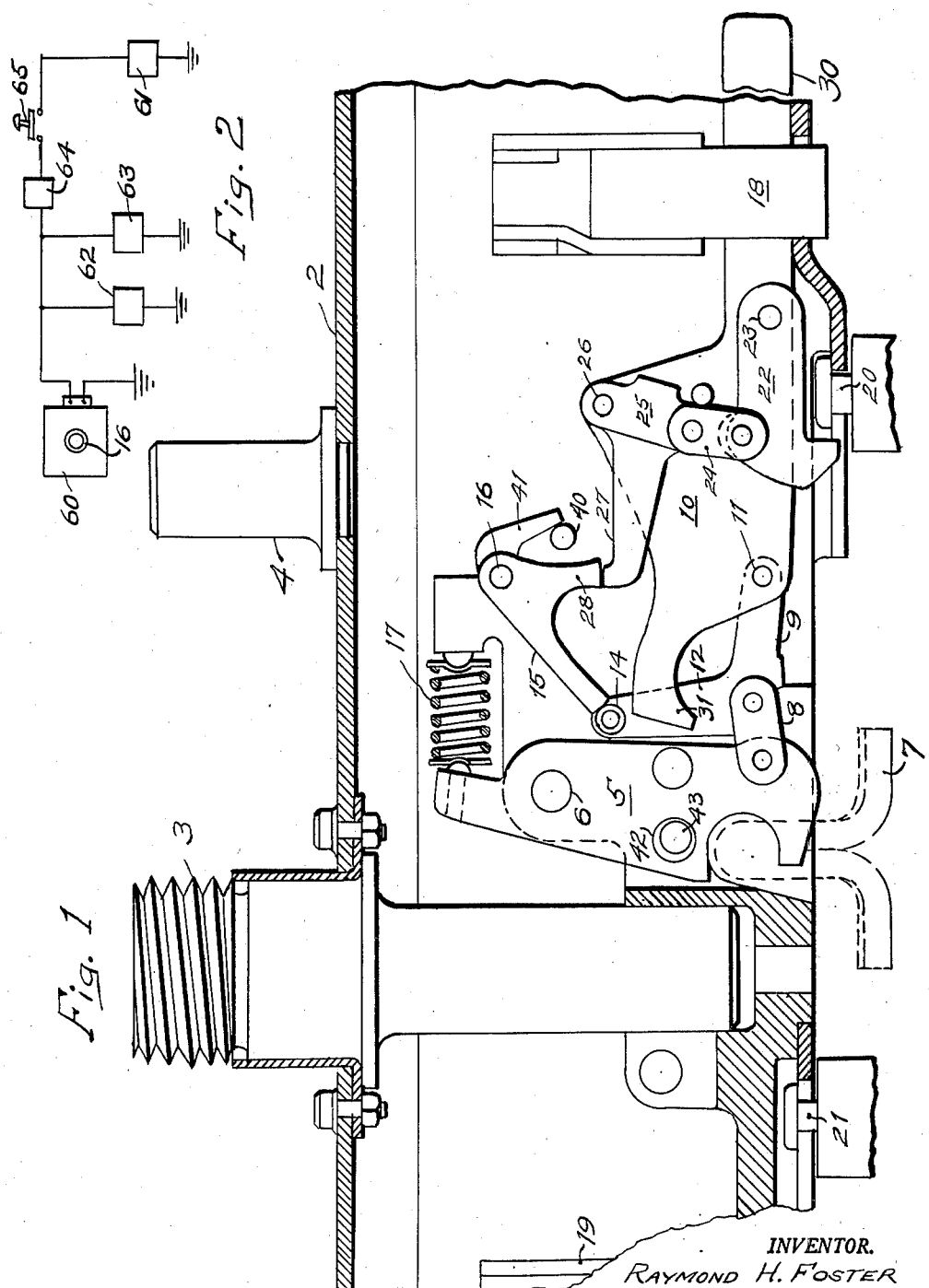
INVENTOR.
RAYMOND H. FOSTER
BY Martin J. Finnegan
ATTORNEY Patented Dec. 30, 1952

2,623,437

UNITED STATES PATENT OFFICE 2,623,437

MECHANISM FOR CARRYING AND RELEASING BOMBS AND ROCKETS

Raymond H. Foster, Hasbrouck Heights, N. J., assignor to Joseph J. Mascuch, Maplewood, N. J.

Application September 16, 1947, Serial No. 774,359

5 Claims. (Cl. 89—1.5)

1

This invention relates to munitions, and particularly to the transportation and release of projectiles, such as may be carried by aircraft and are intended for release when the craft approaches a target.

Different types of projectiles, being of different shapes and designs, require different types of holding fixtures; yet it is desirable that a single control unit on an aircraft be capable of receiving and discharging more than one type of missile. Thus it is customary to expect such a single control unit to be capable of receiving either a "bomb" of the vertically dropping type, or a "rocket" which is intended to move, upon discharge, in a line substantially parallel to the direction of motion of the craft from which it is discharged.

Multiple-duty units of the capabilities indicated are available, but there is room for improvement in the structure, inter-relationship of parts, and mode of operation of such units. The present invention provides such improvements.

An object of the present invention, therefore, is to provide a combined bomb carrier and rocket launcher of novel construction.

A second object is to provide, in a device of the character indicated, a novel construction of locking linkages, one for assuring retention of a bomb in the carrying unit, the other for assuring retention of a rocket therein, together with novel unitary means for shifting either of said locking linkages to the bomb or rocket releasing position.

Another object of the invention is to provide novel electro-magnetically controlled means for simultaneously exerting locking pressure upon both said locking linkages.

A further object is to provide such locking linkages in the form of toggle joints in which the component links are maintained in locking alignment by lateral pressure directed against the joints; the same instrumentality being effective to exert such pressure on both joints.

These and other objects of the invention will be more readily understood upon examination of the following description of the preferred embodiment illustrated in the drawings forming part of this application. It is to be understood, of course, that the invention is not limited to the particular embodiment illustrated, but only by the scope of the appended claims.

In the drawings:

Fig. 1 is a mechanical assembly view of a device embodying the invention;

Fig. 2 is a diagram of electrical connections.

2

In Fig. 1 reference numeral 2 designates a casting adapted to receive a threaded stud 3 by which the complete assembly may be attached to the underside of an airplane wing (not shown) or other surface of the craft which is to carry the device. The casting 2 is also apertured to receive a pin 4 adapted to register with a socket in the wing structure and thus prevent the unit from swiveling about attaching screw 3 as a pivot.

Projecting laterally from the vertical side wall of casting 2 is a boss 6 serving as a pivotal support for a relatively massive rocker element 5 whose lower end is formed into a hook adapted to receive and retain the hanger fixture 7 of a gravity type bomb. A link 8 connects the hook element 5 to a lever 9, the latter being journaled on a boss 11 of the frame 2. Also journaled on boss 11 is a lever 30 having a wider portion 10 adjacent the pivot bearing 11, and terminating in a nose portion 31, to be further described. Extension 12 of levers 9 has a roller 14 contacting the end of a member 15 carried on a shaft 16, to swing with said shaft when the latter turns. Shaft 16 is part of the rotor assembly of a rotary solenoid 60, shown schematically in Fig. 2.

Referring now to Fig. 2, there is shown diagrammatically a source of current 61, a solenoid 60 (for operation of shaft 16 of Fig. 1, as just described), a rocket igniting unit 62, a bomb arming solenoid 63, a time delay switch 64, and a manually operable switch 65. The functions of parts 62, 63, and 64 will appear hereinafter.

Spring 17 tends to rotate hook 5 about its pivot point 6 and aid the rotating motion exerted by the pull on the hook by the bomb load at point 7. Such motion takes place when the rotary solenoid is energized to move member 15 away from contact with roller 14. The forces on hook 5 then cause a collapse of the link 8, moving lever 9 about pivot 11 and arm 12 upward and to the right. The hook then pivots about 6 in such a manner as to release the bomb hanger from point 7. The mechanism remains in the unlocked position until another bomb is loaded into the rack.

Rockets are provided with two buttons 20 and 21 which are hooked into suitable slots in the bottom frame of the unit. The rear button 20 has to raise lever 22 and pivot it about hinging point 23 before entering its slot. This it can do only if the mechanism is in the "released" position to be described. Link 24 connects 22 to secondary link 25 pivoted at 26. Extension 27 of link 25 contacts the bottom face of member 28 of 15. If 15 is in the position shown, the retainer hook 22 cannot move either to insert or release a rocket. It is necessary for 15 to rotate clockwise slightly so as to break contact between 27 and 28. If this is brought about, such as by closing switch 65 and thereby energizing the solenoid, 60 (Fig. 2), the force of the rocket against the hook member of 22 will cause the latter to pivot about 23, collapsing links 24 and 25 and permitting the rocket to move forward under its own power and drop away from the airplane. The firing of the rocket is brought about by unit 62 which is wired in shunt with solenoid 60; so that the rocket firing and the energization of the solenoid are done at the same time by closing switch 65.

Hinge 23 is so proportioned as to act as a shear pin in case the mechanism fails to function when the rocket is fired. The forward force of the rocket breaks the hinge carrying hook 22 forward and permitting the hooks 20 to move forward to release the rocket.

After the rocket is loaded in the launcher, lever 30 which is an extension of frame 10 is moved up. This movement about pivot 11 forces link 8 down through the action of nose 31, moving arm 12 to the position shown and allowing the spring return of solenoid to rotate arm 28 to the "locked" position. When arm 30 is again moved down, extension 27 acts on links 24 and 25 to lock hook 22 against rocket button 20. Lever 30 cannot again be moved up and this is an indication that the mechanism is locked and it is safe to take off with the rocket.

Manual instead of electrical means are also provided to release the mechanism in order to remove a faulty rocket. Removing pin 40 and rotating lever 41 against arm 28 so as to pivot it and break contact with 27 will permit raising 30 enough for the button 20 to slide under hook 22. Similarly, for the bomb, as 15 is rotated, arm 12 slides upward and to the right to collapse hinge 8 and permit hook 5 to rotate anti-clock. Hanger 7 can then drop out.

To check if bomb mechanism is in working order, after the bomb is in place but at the same time prevent its dropping off, hook 5 has an enlarged hole 42. A pin 43 is inserted in a suitable hole in the casting and through 42. With pin in place, the hook has a limited motion, not enough to permit the release of the bomb. For checking, either the solenoid is energized or the manual release is operated. After the partial release, lever 30 is raised to re-lock and again lowered to position.

Arming solenoid 63 (one or more) is incorporated for permitting the release of the bombs either for timed explosion or contact explosion.

I claim:

1. In a mechanism for carrying either a bomb or rocket to be subsequently released by remote control, a carrying frame having a recess along its lower edge, and also having a hook depending therefrom, the recess being adapted to receive a rocket fixture and the hook being adapted to receive a bomb fixture, means including a pair of toggle elements, and a cooperating bifurcated element engaging with one of said toggle elements for locking said rocket fixture in said recess, means including a second pair of toggle elements and the same bifurcated element above referred to for locking said bomb fixture on said hook, depending upon whether a bomb or a rocket is being carried, and means responsive to rotation of said bifurcated element to unlock both pairs of toggle elements simultaneously.

2. A mechanism as in claim 1, said breaking means including a solenoid operable to swing said bifurcated element out of engagement with said toggle elements.

3. A mechanism as in claim 2, including spring means constantly tending to break one of said toggle joints, and serving to swing the component links of said joint when said bifurcated element is moved out of abutting relationship.

4. In a rocket controlling mechanism, a supporting frame having a slotted base forming a run-way, means for retaining a rocket appendage in suspension on said run-way, said means including a hook extending into said run-way and a shear pin holding said hook in position to block any advance of said rocket except upon firing of the rocket and consequent raising of the hook, or shearing of the pin if the hook does not raise, said retaining means also comprising a pair of links pivotally connected to form a toggle joint and a pivotal member abutting one of said links to exert a locking pressure on said joint, control means operating upon said pivotal element for breaking said toggle joint.

5. A mechanism as in claim 4, wherein said control means comprises a rock-shaft and electro-magnetic means concentric with said rock-shaft for rocking the latter and thereby releasing said pressure-exerting means.

RAYMOND H. FOSTER.

REFERENCES CITED

The following references are of record in the file of this patent:

UNITED STATES PATENTS

| Number | Name | Date |
| --- | --- | --- |
| 2,414,579 | Anderson | Jan. 21, 1947 |
| 2,430,636 | Gould | Nov. 11, 1947 |
| 2,435,639 | Stockton | Feb. 10, 1948 |

FOREIGN PATENTS

| Number | Country | Date |
| --- | --- | --- |
| 497,090 | Great Britain | Dec. 7, 1938 |
| 581,889 | Great Britain | Oct. 29, 1946 |